United States Patent
Sindalovsky et al.

(10) Patent No.: US 6,937,717 B2
(45) Date of Patent: Aug. 30, 2005

(54) LOW POWER SIGNAL DETECTION

(75) Inventors: Vladimir Sindalovsky, Perkasie, PA (US); Donald Raymond Laturell, Allentown, PA (US)

(73) Assignee: Agere Systems Inc., Allentown, PA (US)

( * ) Notice: Subject to any disclaimer, the term of this patent is extended or adjusted under 35 U.S.C. 154(b) by 657 days.

(21) Appl. No.: 09/820,392

(22) Filed: Mar. 29, 2001

(65) Prior Publication Data

US 2002/0159584 A1 Oct. 31, 2002

(51) Int. Cl.[7] .............................. H04M 3/00; H04B 1/00
(52) U.S. Cl. ....................... 379/386; 379/286; 379/290; 375/152
(58) Field of Search .......................... 379/386, 388.06, 379/399.01, 399.02, 282–286, 290, 418; 375/136, 147, 150–152; 702/69, 74–76; 708/311

(56) References Cited

U.S. PATENT DOCUMENTS

| | | | | |
|---|---|---|---|---|
| 5,319,702 A | * | 6/1994 | Kitchin et al. | 379/189 |
| 5,408,529 A | * | 4/1995 | Greaves | 379/386 |
| 5,539,812 A | * | 7/1996 | Kitchin et al. | 379/189 |
| 5,659,606 A | * | 8/1997 | Druilhe | 379/283 |
| 5,828,266 A | * | 10/1998 | Couet | 329/325 |
| 6,021,192 A | * | 2/2000 | Jones | 379/283 |
| 6,661,891 B1 | * | 12/2003 | Djadi et al. | 379/386 |
| 6,704,400 B1 | * | 3/2004 | Liang et al. | 379/93.35 |
| 6,831,905 B1 | * | 12/2004 | Lomp et al. | 370/335 |

* cited by examiner

*Primary Examiner*—Binh Tieu
*Assistant Examiner*—Tuan Pham

(57) ABSTRACT

The present invention provides a low power method and apparatus for detecting a signaling tone. The apparatus comprises a resonator which can be configured to resonate at a specified frequency, a controller for configuring the resonator, and a comparator for comparing the output of the resonator as configured by the controller. The method comprises configuring the resonator to resonate at a first frequency to generate an output, configuring the resonator to resonate at a second frequency to generate an output, comparing the outputs, and indicating the presence of a signal if the output of the resonator configured to resonate at a first frequency exceeds the output of the resonator configured to resonate at a second frequency by a predefined amount.

20 Claims, 3 Drawing Sheets

FIG. 1
(PRIOR ART)
| BIN NUMBER | FREQUENCY (kHz) |
|---|---|
| 12 | 51.75 |
| 14 | 60.375 |
| 40 | 172.5 |
| 56 | 241.5 |
| 64 | 276 |
| 72 | 310.5 |
| 88 | 379.5 |
| 96 | 414 |
FIG. 2
(PRIOR ART)
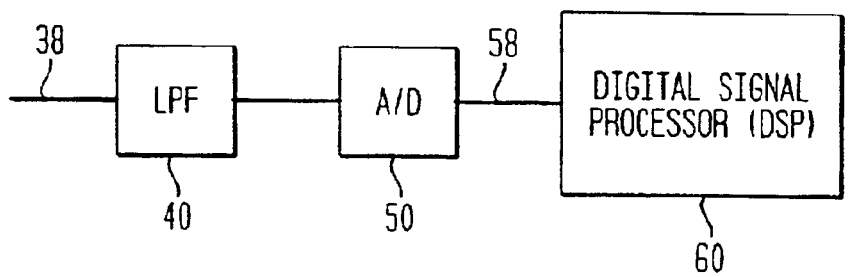
FIG. 3
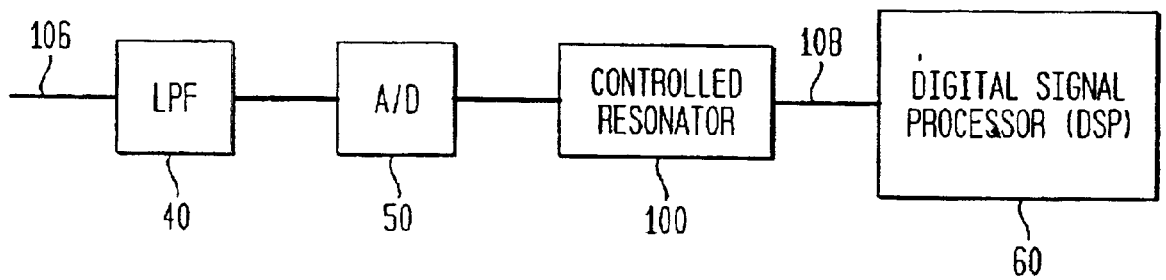

LOW POWER SIGNAL DETECTION

FIELD OF THE INVENTION

The present invention relates to telecommunications and, more particularly, to a method and apparatus for detecting signals on a transmission line.

BACKGROUND OF THE INVENTION

Telecommunication systems are used to transmit information between communication devices. In order to handle transmission demands, telecommunication systems have become increasingly complex. Presently, telecommunication systems employ processor driven devices which exchange information by transferring the information using overlapping frequencies carried on a single transmission line. In systems using overlapping frequencies to exchange information, some of the frequencies are reserved for signaling (i.e., signaling frequencies). Through the use of indicators at the signaling frequencies, processors within the telecommunication systems set up, control, and terminate the exchange of information over the transmission line.

In a typical telecommunication system employing signaling, a processor at telephone company central office (TCCO) will generate tones (i.e., indicators) for detection by a processor at a user site. The signaling tones take the form of increased voltage levels at corresponding signaling frequencies, with the processor at the user site monitoring the signaling frequencies for the increased voltage levels. In addition to setting up, controlling, and terminating the exchange of information, new standards are being developed (such as standard G.994.1-Handshake Procedures for Digital Subscriber Line (DSL) Transceivers developed by the International Telecommunications Union (ITU), incorporated fully herein by reference) which require the processor to wake up in response to receiving signaling tones.

These new standards are problematic for modem computer systems which switch to a low power state (e.g., "sleep mode") during periods when the full processing power of the processor is not required in order to conserve energy. In present computer systems, when the DSP is in a sleep mode, the DSP is unable to perform signal detection. Therefore, in order to comply with developing standards while allowing computer systems to take advantage of placing processors in a sleep mode, an alternative method and apparatus for signal detection is required.

FIG. 1 depicts an example of a list of signaling frequencies 30 from standard G.994.1 which can be used for signaling in a telecommunication system. Each signaling frequency in the list 30 corresponds to a signaling bin from a signaling bin list 20. For example, a signaling frequency of 172.5 kHz corresponds to signaling bin number 40. Between each signaling bin depicted in signaling bin list 20 are one or more bins (not shown) which are used for transmitting data. For example, the next bin illustrated after bin number 40 from signaling bin list 20 is bin number 56; thus, from this drawing it can be seen that bins 41-55 are not used for signaling. Typically, each bin is separated from an adjacent bin by a specified distance (e.g., 4.3125 kHz in standard G.994.1). Accordingly, if the bins are 4.3125 kHz apart, bin number 41 is located at 176.8125 kHz (172.5+4.3125).

Prior to transmitting data, the telecommunication system will enter a set-up period in which information is exchanged between the processor residing at the user site and the processor at the TCCO. The set-up period provides for "handshaking" between the processors in order to optimize the connection between them for carrying data. During the setup period, the data transmission bins which are not used for signaling will reflect only noise on the transmission line and, therefore, can be used as a reference for detecting whether a signaling tone, identified by an increased voltage level, is present on an adjacent signaling bin from the signaling list 20.

In accordance with standard G.994.1, the signaling bins in signaling bin list 20 may be used to designate the presence of incoming data through the presence or absence of an indicator on a corresponding signaling frequency. For example, an indicator at 172.5 kHz in bin number 40 may indicate that additional data will soon follow, whereas the absence of an indicator in bin number 40 will indicate that additional data is not currently on its way. This information (presence or absence of an indicator) can be used by the processor to reallocate resources to interpret data received from the TCCO. In addition, standard G.994.1 allocates one or more bins for "waking up" a processor which is in a sleep mode. Unfortunately, present processors are unable to detect signaling tones while in a sleep mode and, hence, would be unable to wake up if an appropriate indicator were sent.

FIG. 2 depicts a prior art system for interpreting the signaling frequencies such as those depicted in signaling frequency list 30 (FIG. 1) carried by a signal on a transmission line 38. In a system such as the one depicted in FIG. 2, the incoming signal is first passed through a low pass filter (LPF) 40 to remove high frequencies contained within the incoming signal on the transmission line 38 that can be attributed to noise and which may result in aliasing (i.e., relatively high frequencies being confused by system circuits as lower frequency signals). The filtered signal is then passed through an analog-to digital (A/D) converter 50 to convert the filtered signal from an analog domain to a digital domain, thereby creating a filtered digital signal at a connection 58 for processing by a digital signal processor (DSP) 60.

The DSP 60 processes the filtered digital signal at the DSP connection 58 to detect and interpret signaling tones present on one or more of the plurality of signaling frequencies. In the systems depicted in FIG. 2, the A\D converter 50 operates at a relatively high sampling frequency (typically many times higher than the highest signaling frequency) to generate a filtered digital signal at the DSP connection 58 having a suitable signal-to-noise ratio (SNR) for data processing by the DSP 60.

Using the DSP 60 to determine if signaling tones are present on one or more of the plurality of signaling frequencies 30, however, requires system power and processing power. The DSP 60 consumes system power and uses processing power to continuously monitor the filtered digital signal for signaling frequencies 30. Therefore, the DSP 60 cannot be allowed to enter a sleep mode during periods when a signaling indicator may be received. In addition, since the power consumption of an A\D converter is approximately proportional to its sampling rate, the A\D converter 50 consumes a relatively high amount of power due to the relatively high sampling rate at which it operates to supply a filtered digital signal with a suitable SNR for the DSP 60.

Many present day computer systems allow the DSP 60 to switch to sleep mode when the DSP 60 is not in use. In sleep mode, the DSP 60 performs only the most essential tasks and, therefore, draws a minimal amount of power. This mode is desirable for conserving energy and battery life. As noted above, however, in sleep mode the DSP 60 is unable to monitor the filtered digital signal at the DSP connection 58 for signaling tones, thereby missing signaling tones. Since the DSP 60 is unable to detect signaling tones in sleep mode, the DSP 60 will not be allowed to enter "sleep mode" when used with new standards such as G994.1 mentioned above.

It is desirable to allow digital signal processors DSP's to enter a low power consumption state while still being able to detect the presence of signaling tones in order to conserve power and to conform to developing standards. Accordingly, there is a need for a low power detection method and apparatus for detecting signaling tones without the use of a system's DSP. The present invention fulfils this need, among others.

SUMMARY OF THE INVENTION

The present invention uses a controlled resonator to provide for a low power detection apparatus and method which overcomes the aforementioned problems of detecting signaling tones while a digital signal processor (DSP) is in a low power consumption state (i.e., "sleep mode"). The controlled resonator enables the detection apparatus and method to selectively amplify incoming signaling tones carried on signaling frequencies such that the signaling tones may be detected with low power consumption circuitry. The detected signaling tones are preferably used to generate an interrupt for "waking-up" the DSP from a sleep mode.

One aspect of the present invention is a low power detection apparatus for detecting signaling tones. In a preferred embodiment, the apparatus comprises: (a) a resonator having an input for coupling to the transmission line and an output; (b) a controller coupled to the resonator for configuring the resonator in a first state corresponding to the signaling frequency and in a second state corresponding to a reference frequency; and (c) a comparator coupled to the output of the resonator for comparing a first value at the output of the resonator configured in the first state to a second value at the output of the resonator configured in the second state with the comparator generating an indicator based on the comparison.

Another aspect of the invention is a low power detection method for detecting signaling tones on one of a plurality of potential signaling tone frequencies on a transmission line carrying a plurality of frequencies. In a preferred embodiment, the method comprises the steps of (1) receiving the plurality of frequencies at a resonator; (2) configuring the resonator to resonate at one of the potential signaling tone frequencies; (3) measuring and storing a first value output by the resonator configured to resonate at one of the potential signaling tone frequencies; (4) configuring the resonator to resonate at a reference frequency; (5) measuring and storing a second value output by the resonator configured to resonate at the reference frequency; (6) comparing the first value to the second value; and (7) generating an indicator indicating whether the first value exceeds the second value by a predefined amount.

BRIEF DESCRIPTION OF THE DRAWINGS

FIG. 1 is a table depicting a prior art list of signaling frequencies;

FIG. 2 is a block diagram depicting a prior art system for interpreting signaling frequencies;

FIG. 3 is a block diagram depicting a detection apparatus in accordance with the present invention.

DETAILED DESCRIPTION OF THE INVENTION

FIG. 3 depicts a preferred embodiment of the present invention. In general, the preferred detection apparatus depicted in FIG. 3 is similar to the prior art detection apparatus depicted in FIG. 2, except for the addition of a controlled resonator 100 positioned between the analog-to-digital (A/D) converter 50 and the digital signal processor (DSP) 60. Through the use of the controlled resonator 100, a low power detection apparatus for detecting signaling tones is achieved in which an indicator is generated at an output port 108 in response to a signaling tone at an input port 106 that can be used to wake up the DSP 60 from a sleep mode. This arrangement permits the DSP 60 to enter a sleep mode while enabling the detection apparatus to performing signal detection, thereby complying with modem standards such as G.994.1-Handshake Procedures for Digital Subscriber Line (DSL) Transceivers developed by the International Telecommunication Unit (ITU).

Figure 4:
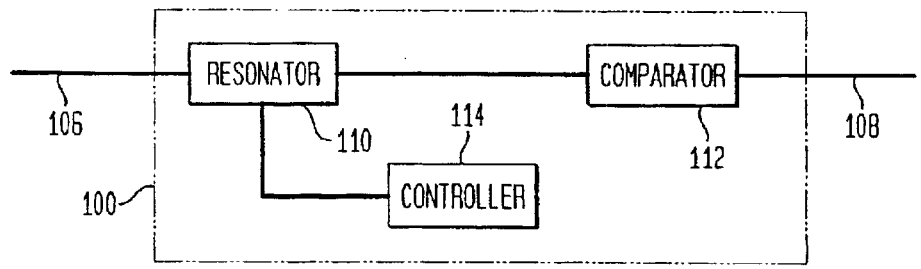
FIG. 4 is a block diagram depicting a basic configuration of a controlled resonator in accordance with the present invention.

FIG. 4 is a block diagram depicting a basic configuration of a controlled resonator 100 in accordance with the present invention. In general, a controlled resonator 100 in accordance with the present invention comprises a resonator 110 which is tunable to specific frequencies for receiving a transmission signal at an input port 106 via a controller 114. A comparator 112 compares the output of resonator 110 when tuned to resonate at one frequency to the output of the resonator 110 when tuned to resonate at another frequency. Comparator 112 compares the output of the resonator 110 in order to generate an indicator at an output port 108.

Figure 5:
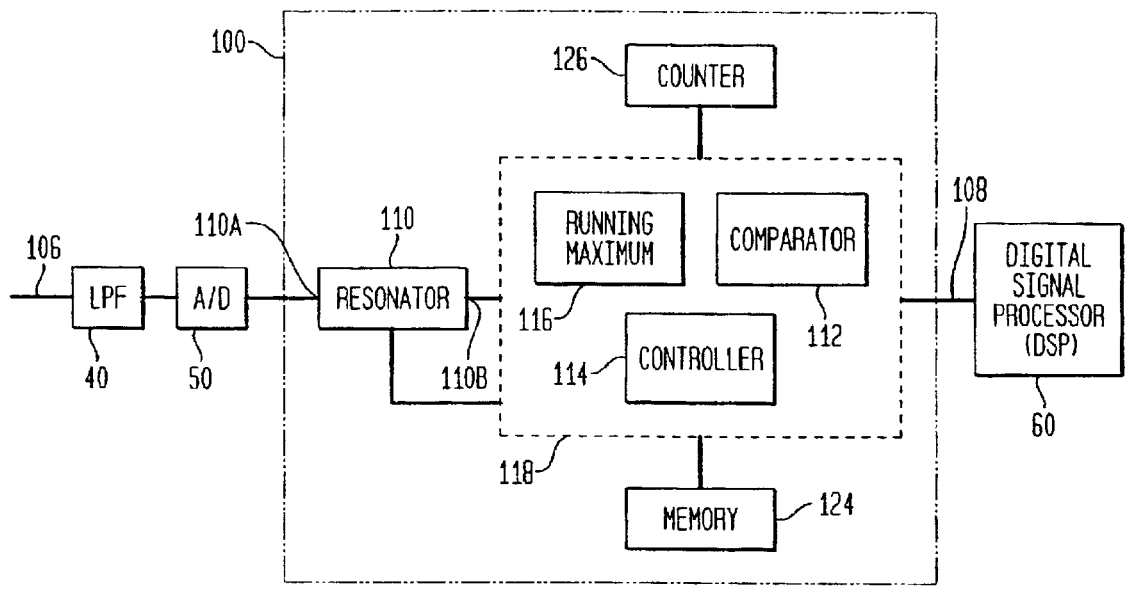
FIG. 5 is a block diagram depicting a preferred controlled resonator in accordance with the present invention.

FIG. 5 depicts a preferred embodiment of a controlled resonator 100 in accordance with the present invention. As shown in FIG. 5, a detection apparatus includes an LPF 40, an A/D converter 50, a controlled resonator 100 (comprising a resonator 110, a comparator 112, a controller 114, a running maximum circuit 116, a memory 124, and a counter 126), and a DSP 60. The detection apparatus is used to detect a signaling tone on an input line 106 and to develop an indicator at an output line 108 which indicates the presence of a signaling tone at a signaling frequency when a signaling tone is detected. Preferably, the indicator is an interrupt used to wake the DSP 60 from a low power consumption state.

The LPF 40 removes unwanted frequencies on the input line 106. In the preferred embodiment, the LPF 40 filters out frequencies which are relatively high compared to the highest signaling frequency to be detected. The relatively high frequencies are filtered out in order to remove frequencies on the input line 106 which may be attributed to noise and may result in aliasing. In the preferred embodiment, the LPF 40 is configured to filter out frequencies above the signaling frequencies to create a filtered analog signal. For example, in the chart depicted in FIG. 1, the highest signaling frequency is 414 kHz, therefore, the LPF 40 would be configured to filter out frequencies above this frequency. Suitable low pass filters for use with the present invention are well known in the art.

The A/D converter 50 converts signals from an analog domain to a digital domain. In the preferred embodiment, the A/D converter 50 converts the filtered analog signal out of the LPF 40 to a filtered digital signal. The A/D converter 50 samples the filtered analog signal at a rate sufficient to reproduce the filtered analog signal as a filtered digital signal with adequate resolution to distinguish overlapping frequencies on the input line 106 from one another. According to Nyquist's equation, an equation well known to those skilled in the art, in order to distinctly maintain overlapping frequencies when converting from analog to digital, the sampling rate must be at least twice the highest analog frequency. In a preferred embodiment, the A/D converter 50 samples the signal at a rate which is approximately ten times the frequency of the highest signaling frequency, e.g., 4.416 MHz, in order to obtain better resolution of the overlapping frequencies, thereby facilitating the identification of the signaling tones.

In a preferred embodiment, the LPF 40 and the A/D converter 50 of FIG. 5 are the LPF 40 and the A/D converter 50, respectively, of the prior art circuit depicted in FIG. 2. Due to a lower signal-to-noise ratio (SNR) requirement for signal detection in the detection circuit of FIG. 5 as compared to the SNR requirement for signal detection with the DSP 60 as in FIG. 2, however, the A/D converter 50 may be operated at a lower sampling frequency in the detection circuit of FIG. 5. Therefore, the A/D converter 50 as configured for use in the present invention will consume less power than as configured for use in the prior art circuit of FIG. 2. Generally, the A/D converter 50, as used in the circuit of FIG. 2, may sample a signal at approximately 35 MHz, while the A/D convertor 50, as configured for use in the circuit of FIG. 5, may sample a signal at approximately 4 MHz. It is known in the art that power consumption is nearly directly proportional to the sampling frequency, therefore, the power savings for the A/D convertor 50 in this example would be approximately 9 fold (35 MHz/4 MHz≈9) for a detection circuit in accordance with the present invention.

In the preferred embodiment, the sampling frequency of the A/D converter 50 as used in the prior art (FIG. 2) can be reduced when the DSP 60 is in a low power consumption state. When the DSP 60 is prompted to return to a regular power consumption state, the sampling frequency of the A/D converter 50 is readjusted to increase its sampling frequency in order to provide a suitable SNR for the DSP 60. In an alternative embodiment, the sampling frequency of the A/D converter 50 remains unchanged. In yet another embodiment, a separate A/D converter 50 is used when detecting signals in a low power state and when interpreting signals with the DSP 60.

In addition, it will be understood by those in the art that if an incoming signal on the input line 106 is a digital signal and the resonator 110 is a digital resonator, the A/D convertor 122 would not be necessary since the signal would already be in the digital domain. Likewise, if the incoming signal on the signal line 106 is an analog signal and the resonator 110 is an analog resonator, the A/D convertor 122 will no longer be necessary since the incoming signal will remain in the analog domain.

Figure 6:
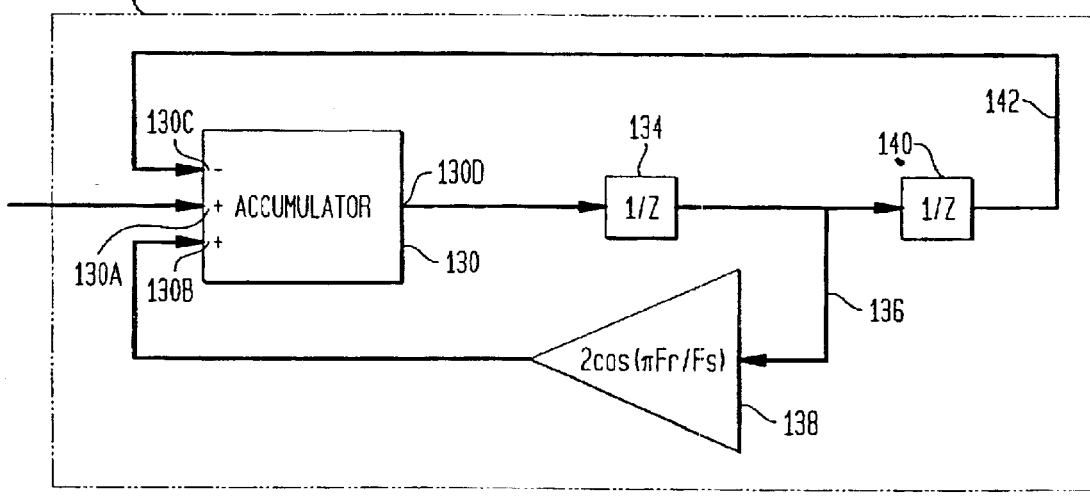
FIG. 6 is a block diagram depicting a preferred resonator for use in the controlled resonator of FIG. 5 in accordance with the present invention.

The resonator 110 is used to amplify a signal at a desired frequency on the resonator input 110A by configuring the resonance frequency of the resonator 110 to equal the desired frequency. The resonator 110 is configurable such that the resonance frequency of the resonator 110 can be changed to match individual signaling frequencies, such as those depicted in FIG. 1, and data frequencies between the signaling frequencies. If a signal is present at the resonance frequency of the resonator 110, a value output by the resonator 110 at the resonator output 110 will oscillate and grow rapidly. When a transmission signal is applied to the resonator input 110A, the amplitude of the oscillations at the resonator output 110B will grow if a signal is present at the resonance frequency of the resonator 110 to produce a large oscillating value at the resonator output 110B. Otherwise, the oscillations will settle at a comparatively low level. An example of a preferred resonator is depicted in FIG. 6, discussed in detail below.

In the preferred embodiment, the resonator 110 resonates at a configured resonance frequency for a specified number of samples (i.e., measurement period) in order to allow sufficient time for a potential signal at the resonance frequency to grow. In the preferred embodiment, approximately 32,000 samples are taken at each configured frequency.

The controller 114 is a conventional controller. In the preferred embodiment, the controller 114 is used to configure the resonator 110 to resonate at specific frequencies. In the preferred embodiment, the controller 114 configures the resonator 110 to resonate at one frequency for a measurement period and then reconfigures the resonator 110 to resonate at another frequency for another measurement period.

The running maximum circuit 116 captures the maximum value output by the resonator 110 during a measurement period. The value output at the resonator output 110B will oscillate at the resonance frequency of the resonator 110. Therefore, during the measurement periods, the output of the resonator 110 will vary. Accordingly, the running maximum circuit 116 is used to detect the highest value output by the resonator 110 during the measurement period. The running maximum circuit 116 preferably operates by storing an initial value output by the resonator 110 for the first sample of a measurement period and then ignoring values if they are lower then the initial value and replacing the initial value if a higher value is output by the resonator 110. The final value stored by the running maximum circuit 116 at the end of the measurement period is then used for comparison to other final values output by the running maximum circuit 116 for other measurement periods.

The comparator 112 is a conventional comparator. In the preferred embodiment, the controller 114 compares the highest output level (determined by the running maximum circuit 116) at the resonator output 110B when the resonator 110 is configured to resonate at one frequency to the highest output level (also determined by the running maximum circuit 116) at the resonator output 110B when the resonator 110 is configured to resonate at another frequency.

In a preferred embodiment, the comparator 112, the controller 114, and the running maximum circuit 116 comprise a state machine 118. It will be understood by those skilled in the art that one or more state machines may be used to perform the functions performed by the state machine 118.

The counter 126 is a conventional counter which controls the number of samples used to allow a signal at the resonance frequency of the resonator 110 to grow in the running maximum circuit 116 (i.e., the measurement period). In the preferred embodiment, the controller 114 starts the count in the counter 126. The counter 126 then signals the controller 114 when the count is finished. In the preferred embodiment, the counter counts up to about 32,000 samples. It will be understood by those skilled in the art that more or less samples could be used without departing from the spirit and scope of the present invention.

The memory 124 is a conventional memory used to store information for use with the preferred tone detector of FIG. 5. In the preferred embodiment, the memory 124 is used to store values used by the controller 114 to configure the resonator 110. In addition, the memory 124 is used to store the values generated by the running maximum circuit 116 for comparison by the comparator 112.

FIG. 6 depicts a preferred resonator 110 for use in the present invention. The components depicted in FIG. 6 are constructed to mimic a resonator which can be represented by the equation:

$$\frac{d^2x}{dt^2} - A\frac{dx}{dt} + B = 0. \tag{1}$$

If B=1, then A=2 cos(2π Fr\Fs) where Fr equals the desired resonance frequency at which the resonator 110 will resonate and Fs equals the sampling frequency of the resonator 110. The preferred resonator 110 comprises an accumulator 130, a first delay element 134 and feedback path 136, a second delay element 140 and feedback path 142, and a multiplier 138.

The accumulator 130 comprises an input port 130A and an output port 130D. The input port 130A corresponds to the resonator input 110A (FIG. 5) and the output 130D corresponds to the resonator output 110B (FIG. 5). In addition, the accumulator 130 contains a first delay input port 130B and a second delay input port 130C.

The first delay element 134 introduces a first delay to the resonator 110 which is equal to one sample at the sampling frequency. In the preferred embodiment, the first delay element 134 is a latch. The delayed signal out of the first delay element 134 is then passed through a multiplier 138 within the feedback path 136 and is input to the accumulator 130 at the first delay input port 130B. In the preferred resonator 110, the multiplier 138 multiplies the delayed signal by 2 cos(2π Fr/Fs), where Fr in the resonance frequency (i.e., frequency to be examined) and Fs is the sampling frequency.

The second delay element 140 introduces a second delay to the system which is equal to one sample at the sampling frequency. In the preferred embodiment, the second delay element is a latch. Since B is assumed to be 1, the output of the second delay element 140 is fed directly to the second delay input port 130C of the accumulator 130.

Figure 7:
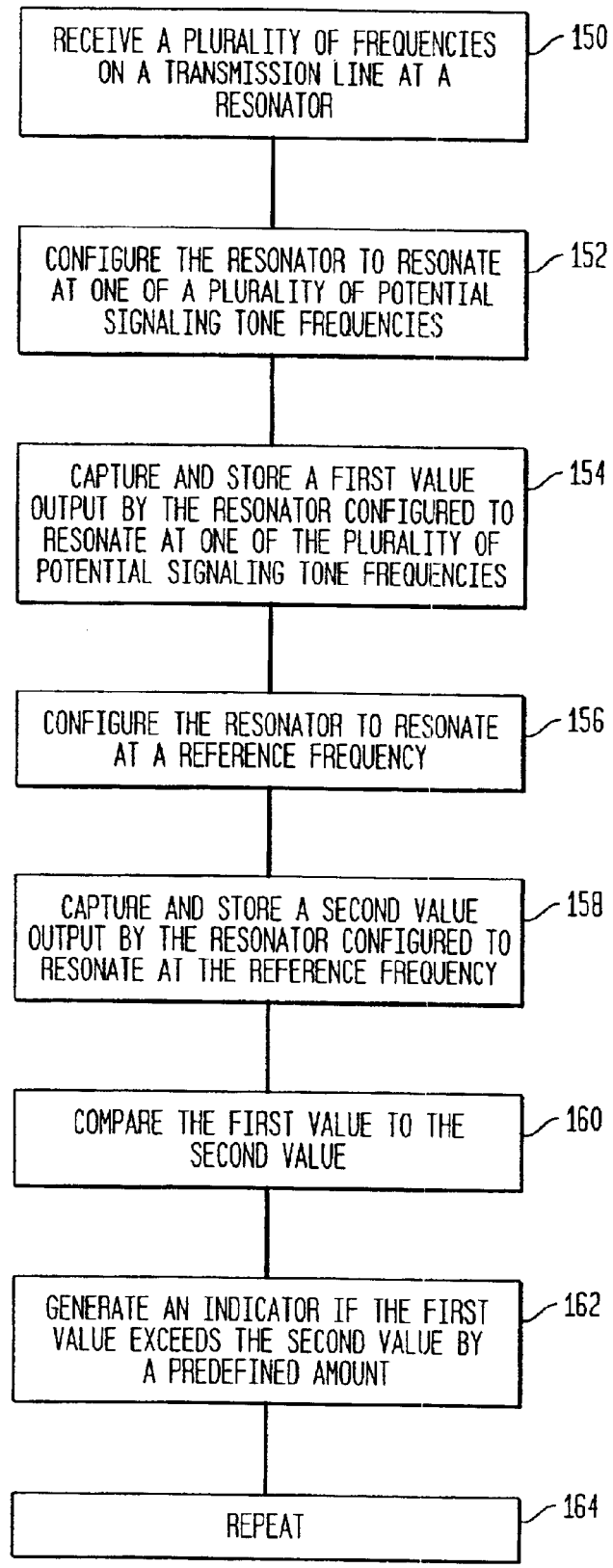
FIG. 7 is a flow chart depicting a method for detecting indicators at signaling frequencies in accordance with the present invention.

In use, the apparatus depicted in FIGS. 3–6 is able to detect the presence of an indicator on one of a plurality of signaling frequencies 30 (FIG. 1) by following the steps depicted in FIG. 7.

In step 150, a transmission signal comprising a plurality of frequencies on a transmission line is received at an input 110A of the resonator 110. The transmission signal comprises signaling frequencies 30 (FIG. 1) and other frequencies, including noise. Each of signaling frequencies 30 have the potential for carrying an indicator (e.g., tone). For illustrative purposes, it is assumed that a tone is present in bin number 40 which corresponds to a signaling frequency of 172.5 kHz.

In step 152, the resonator 110 is configured to resonate at one of a plurality of potential signaling frequencies 30 for a measurement period. It will be understood by those skilled in the art that the signaling frequencies 30 are for illustration only, with actual signaling frequencies potentially varying in number and frequency. In the preferred embodiment, the resonator 110 is configured by the controller 114 of the state machine 118 to resonate at a first frequency within a series of potential signaling frequencies 30 that are to be checked for a signaling tone. The output of the resonator 110 will resonate at the configured frequency. In the example, the resonator 110 is set to resonate at 172.5 kHz (the signaling frequency of bin number 40) to detect the presence of the signaling tone in bin number #40 (FIG. 1). If a signaling tone is present at the resonance frequency, the output of the resonator 110 will oscillate and grow. Otherwise, the oscillations will settle at a comparatively low level.

In step 154, the output of the resonator 110, as configured in step 152, is captured and stored. In the preferred embodiment, the output is captured by the running maximum circuit 116 and stored in the memory 124. Since the output of the resonator 110 resonates at the configured frequency, the output of the resonator 110 will oscillate. Accordingly, the running maximum circuit 116 is used to capture the highest level output by the resonator 110 during the measurement period, and the value determined by the running maximum circuit 116 is stored in memory 124.

In step 156, the resonator 110 is configured to resonate at a reference frequency which will not contain a signaling tone for another measurement period. In the preferred embodiment, the reference frequency is a frequency near the one of a plurality of potential signaling tone frequencies 30 used in step 152 (e.g., frequency of an adjacent data bin). Since the reference frequency will not contain a signaling tone, the reference frequency will reflect background noise. In the example, the resonator 110 would be set to resonate at 176.8125 kHz (172.5+4.3125) which corresponds to bin number 41, a bin which will not contain a signaling tone according to FIG. 1.

In step 158, the output of the resonator 110 for the measurement period, as configured in step 156, is captured and stored. In the preferred embodiment, the output is captured by the running maximum circuit 116 and stored in memory 124 as discussed in step 154. Since, as discussed in step 156, the reference frequency reflects background noise, the output of the resonator 110 will reflect background noise.

In step 160, the output of the resonator 110 stored in step 154 is compared to the output of the resonator 110 stored in step 158 by the comparator 112. In the preferred embodiment, the comparator 112 compares the highest value output by the resonator 110 as determined by the running maximum circuit 116 when configured at the signaling frequency to the highest value output by the resonator 110 when configured at the reference frequency. This enables the signaling frequency 30 to be compared to the background noise to determine if the highest value output by the resonator is due to a tone at the one of a plurality of potential signaling frequencies 30 or is due to background noise at the signaling frequency.

In step 162, if the output of the resonator 110 corresponding to a potential signaling frequency 30 (step 154) exceeds the output of the resonator 110 corresponding to background noise (step 158) by a predetermined amount, an indicator at an indicator output 108 indicates the presence of a signaling tone. If the output of the resonator 110 corresponding to the potential signaling frequency 30 does not exceed the output of the resonator 110 corresponding to background noise by a predetermined amount (e.g., the values are essentially the same), the indicator at the indicator output 108 will not indicate the presence of a signaling tone. In a preferred embodiment, the indicator at the indicator output 108 is an interrupt which is used to wake-up a processor from a low power consumption state if a signaling tone is detected.

In step 164, the process is repeated for one or more of the plurality of potential signaling tone frequencies 30. In a preferred embodiment, the process is repeated for each one of the plurality of potential signaling tone frequencies 30. In an alternative embodiment, the process is repeated for each one of a group of potential signaling frequencies 30.

In an alternative embodiment of the method of FIG. 7, steps 150, 152, and 154 are performed to determine a value output by the resonator 110 corresponding to a potential signaling frequency 30. This value is then compared to an average of a plurality of values that reflect background noise which are calculated and stored at a previous time. The output of the resonator 110 stored in step 154 is then compared to this predetermined value to see if an indicator should be generated at the indicator output 108.

In the illustrated embodiment, the determination of a signaling tone present at one of a plurality of potential signaling tone frequencies is performed sequentially. For example, a value for a first potential signaling tone is captured during a first measurement period. Then a value for a reference frequency is captured during a second measurement period. The process is then repeated for each potential signaling frequency. In an alternative embodiment, the determination of a signaling tone present at one of a plurality of potential signaling tone frequencies is performed in parallel. If the detection apparatus of FIGS. 4 and 5 operate at a sampling rate which is eight times the sampling rate of the A/D converter 122, the resonator can be tuned to eight different frequencies during each sample, thereby permitting eight values to be determined and captured essentially simultaneously. For example, the detection apparatus could detect bin numbers 40, 41, 56, 57, 64, 65, 72, and 73 (FIG. 1) and store a generated value during a single measurement period.

Having thus described a few particular embodiments of the invention, various alterations, modifications, and improvements will readily occur to those skilled in the art. Such alterations, modifications and improvements as are made obvious by this disclosure are intended to be part of this description though not expressly stated herein, and are intended to be within the spirit and scope of the invention. Accordingly, the foregoing description is by way of example only, and not limiting. The invention is limited only as defined in the following claims and equivalents thereto.

What is claimed is:

1. A detector for detecting a signal at a signaling frequency on a transmission line carrying a communication signal comprising signaling frequencies and noise, said detector comprising:

a resonator having an input configured for coupling to the transmission line to receive the communication signal, an output for outputting a resonated signal, and a control used to configure said resonator;

a controller coupled to said control of said resonator for configuring said resonator in a first state corresponding to the signaling frequency and in a second state corresponding to a reference frequency;

a comparator coupled to the output of said resonator for comparing a first value of said resonated signal at the output of said resonator configured in said first state to a second value of said resonated signal at the output of said resonator configured in said second state, said comparator generating an indicator based on the comparison;

a running maximum circuit coupled between said resonator and said comparator for determining a first largest value of said resonated signal at said output of said resonator configured in said first state during a measurement period, said first largest value being said first value, and determining a second largest value of said resonated signal at said output of said resonator configured in said second state during another measurement period, said second largest value being said second value; and a counter coupled to said running maximum circuit and said controller for determining said measurement periods.

2. The detector of claim 1, further comprising:

a memory coupled to said state machine for storing data used by said controller to configure said resonator and for storing said first and second values.

3. The detector of claim 2, wherein said resonator comprises:

an accumulator having an input which is said input of said resonator, a first feedback input, a second feedback input, and an output which is said output of said resonator;

a first delay element having an input coupled to said output of said accumulator and an output, said first delay element introducing a first delay to said resonated signal;

a first feedback path coupled between said output of said first delay element and said first feedback input of said accumulator, said first feedback path comprising a multiplier configurable by said controller for multiplying said delayed resonated signal by a coefficient;

a second delay element having an input coupled to the output of said first delay element and an output, said second delay element introducing a second delay to said delayed resonated signal; and a second feedback path between the output of said second delay element and the second feedback input of said accumulator.

4. The detector of claim 3, wherein said first delay element is a first latch and said second delay element is a second latch.

5. The detector of claim 1, further comprising:

a low pass filter having an output and an input for coupling to the transmission line, said low pass filter filtering out frequencies of the communication signal above a predefined frequency; and an analog-to-digital converter having an input coupled to the output of said low pass filter and an output coupled to the input of said resonator for converting the filtered communication signal to a digital domain.

6. A tone detector for detecting the presence of a signaling tone on one of a plurality of potential signaling tone frequencies on a telephone line carrying a communication signal, said tone detector comprising:

a resonator having an input configured for receiving the communication signal, a control for configuring the resonator, and an output for outputting a resonated signal which is partially dependent on the configuration of said resonator; and a state machine coupled to said resonator for configuring said resonator and processing said resonated signal generated by said resonator to produce an indicator; wherein:

said state machine configures said resonator in a first state corresponding to a frequency of the signaling tone for a measurement period to obtain a first value, said state machine configures said resonator in a second state corresponding to a reference frequency for another measurement period to obtain a second value, and said state machine compares said first value to said second value to generate said indicator if said first value exceeds said second value by a predefined amount; and wherein said resonator comprises:

an accumulator having a first input for receiving the communication signal, a first feedback input, a second feedback input, and an output for outputting said resonated signal;

a first delay element having an input coupled to said output of said accumulator and an output, said first delay element introducing a first delay to said resonated signal;

a first feedback path coupled between said output of said first delay element and said first feedback input of said accumulator, said first feedback path comprising a multiplier configurable by said state machine for multiplying said delayed resonated signal by a coefficient;

a second delay element having an input coupled to said output of said first delay element and an output, said second delay element introducing a second delay to said delayed resonated signal; and a second feedback path coupled between said output of said second delay element and said second feedback input of said accumulator.

7. The tone detector of claim 6, wherein;

said state machine configures said resonator in a first state corresponding to a frequency of the signaling tone for a measurement period to obtain a first value and compares said first value to a second value representing noise on the communication signal to generate said indicator if said first value exceeds said second value by a predefined amount.

8. The tone detector of claim 6, further comprising:

a low pass filter coupled between the telephone line and said resonator for filtering out frequencies above a desired frequency to reduce noise and aliasing; and an analog-to-digital converter coupled between said low pass filter and said resonator for converting analog signals on the telephone line to digital signals for processing by said resonator and said state machine.

9. The tone detector of claim 6, wherein said state machine comprises:

a running maximum circuit coupled to the output of said resonator for detecting said first value and said second value during said measurement periods.

10. The tone detector of claim 9, wherein said tone detector further comprises:

a counter coupled to said state machine for determining said measurement periods.

11. The tone detector of claim 6, wherein, in said first state, said coefficient is a function of the frequency of the signaling tone and a sampling frequency and, in said second state, said coefficient is a function of the frequency of said reference frequency and said sampling frequency.

12. The tone detector of claim 6, wherein said first delay element is a first latch and said second delay element is a second latch.

13. The tone detector of claim 6, further comprising:

a memory for storing information, said memory comprising data for use by said state machine to configure said resonator.

14. A method for detecting the presence of a signaling tone on one of a plurality of potential signaling tone frequencies in a communication signal on a transmission line comprising the steps of:

(1) receiving the communication signal at a resonator;

(2) configuring said resonator to resonate at one of the potential signaling tone frequencies;

(3) capturing and storing a first value output by said resonator configured to resonate at said one of the potential signaling tone frequencies;

(4) configuring said resonator to resonate at a reference frequency;

(5) capturing and storing a second value output by said resonator configured to resonate at said reference frequency;

(6) comparing said first value to said second value using a comparator;

(7) generating an indicator indicating whether said first value exceeds said second value by a predefined amount;

(8) using a running maximum circuit coupled between said resonator and said comparator for determining a first largest value of said resonated signal at said output of said resonator configured in said first state during a measurement period, said first largest value being said first value, and determining a second largest value of said resonated signal at said output of said resonator configured in said second state during another measurement period, said second largest value being said second value; and (9) determining said measurement periods using a counter coupled to said running maximum circuit and said controller.

15. The method of claim 14, further comprising the step of repeating steps 2 through 7 for each of said plurality of potential signaling tone frequencies.

16. The method of claim 14, further comprising the steps of:

filtering the communication signal to remove frequencies above a predefined amount; and converting the filtered communication signal from analog to digital;

wherein said filtering and converting are performed prior to being received by said resonator.

17. The method of claim 14, further comprising the step of repeating steps 2, 3, 6, and 7 for each of said plurality of potential signaling tone frequencies.

18. The method of claim 14, wherein said indicator is an interrupt used to wake a processor from a low power mode.

19. The method of claim 14, wherein steps 2, 3, 4, and 5 are performed serially.

20. The method of claim 14, wherein steps 2, 3, 4, and 5 are performed in parallel.

* * * * *